US011511700B2

(12) United States Patent
Nakajima et al.

(10) Patent No.: US 11,511,700 B2
(45) Date of Patent: Nov. 29, 2022

(54) AIRBAG APPARATUS (71) Applicant: Autoliv Development AB, Vargarda (SE)

(72) Inventors: Yutaka Nakajima, Kanagawa (JP); Royta Ishigaki, Kanagawa (JP); Yoshiki Ito, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 16 days.

(21) Appl. No.: 16/980,972

(22) PCT Filed: Mar. 8, 2019

(86) PCT No.: PCT/JP2019/009437
§ 371 (c)(1),
(2) Date: Sep. 15, 2020

(87) PCT Pub. No.: WO2019/181574
PCT Pub. Date: Sep. 26, 2019

(65) Prior Publication Data
US 2021/0362669 A1 Nov. 25, 2021

(30) Foreign Application Priority Data

Mar. 23, 2018 (JP) ................................ 2018-056243

(51) Int. Cl.
*B60R 21/233* (2006.01)
*B60R 21/205* (2011.01)
*B60R 21/231* (2011.01)

(52) U.S. Cl.
CPC .......... *B60R 21/233* (2013.01); *B60R 21/205* (2013.01); *B60R 21/231* (2013.01);
(Continued)

(58) Field of Classification Search
CPC ... B60R 21/233; B60R 21/205; B60R 21/231; B60R 2021/23332; B60R 2021/0044;
(Continued)

(56) References Cited

U.S. PATENT DOCUMENTS 6,419,262 B1 7/2002 Fendt et al.
2014/0291972 A1 10/2014 Fukawatase et al.
(Continued)

FOREIGN PATENT DOCUMENTS

DE 102016119568 A1 4/2018
JP 01-132444 A 5/1989
(Continued)

OTHER PUBLICATIONS

International Search Report of the International Searching Authority for PCT/JP2019/009437 dated Apr. 9, 2019.
(Continued)

*Primary Examiner* — Keith J Frisby
(74) *Attorney, Agent, or Firm* — Foley & Lardner LLP (57) ABSTRACT

[Problem] To provide an airbag apparatus in which the injury value of a passenger can be efficiently suppressed in an emergency.
[Resolution Means] A typical configuration of an airbag apparatus 100 according to the present invention includes: an inflator 118 which is installed in a vehicle so as to be capable of supplying gas; an inner bag 112 which is expanded from in front of a seat utilizing the gas; and an outer bag 110 to which the gas is supplied from the inflator 118 or via the inner bag 112 and expanded so as to surround the inner bag 112. The outer bag 110 includes an opening 116 which exposes the inner bag 112 towards the seat 104, wherein the inner bag 112 has a more elongated shape in the anteroposterior direction of the vehicle than in the width direction of the vehicle, and the inner bag 112 further
(Continued)

includes a restraining part 114 which is exposed on the recessed surface from the opening 116 to the seat side.

15 Claims, 6 Drawing Sheets

(52) U.S. Cl.
CPC ............... *B60R 2021/23308* (2013.01); *B60R 2021/23332* (2013.01)

(58) Field of Classification Search
CPC .. B60R 2021/0048; B60R 2021/23308; B60R 2021/23316; B60R 2021/23324
USPC ...................................... 280/729, 732, 743.1
See application file for complete search history.

(56) References Cited

U.S. PATENT DOCUMENTS

| | | |
|---|---|---|
| 2017/0057453 A1 | 3/2017 | Morris et al. |
| 2018/0354447 A1 | 12/2018 | Nakajima et al. |
| 2019/0118758 A1* | 4/2019 | Arima ................... B60R 21/233 |
| 2019/0308582 A1* | 10/2019 | Stegmeier ............. B60R 21/233 |

FOREIGN PATENT DOCUMENTS

| | | |
|---|---|---|
| JP | H02-283545 A | 11/1990 |
| JP | 10-081191 A | 3/1998 |
| JP | 2003-504272 A | 2/2003 |
| JP | 2017-114201 A | 6/2017 |
| WO | 2013/054397 A1 | 4/2013 |
| WO | 2017/090772 A1 | 6/2017 |

OTHER PUBLICATIONS

English translation of International Search Report of the International Searching Authority for PCT/JP2019/009437 dated Apr. 9, 2019.

* cited by examiner

A-A line cross section

B-B line cross section

AIRBAG APPARATUS

TECHNICAL FIELD

The present invention relates to an airbag apparatus which restrains passengers in the event of an emergency.

BACKGROUND

Airbag devices have generally become standard equipment in vehicles in recent years. An airbag apparatus is a safety apparatus which is operated in the event of an emergency such as a vehicle collision, catching and protecting passengers utilizing an airbag cushion which expands and deploys by gas pressure. There are various types of airbag devices depending on the installation site and application. For example, in order to mainly protect passengers in the front seat from impact in the anteroposterior direction, a front airbag is provided in the center of the steering wheel in the driver seat, while a passenger airbag is provided in the instrument panel and peripheral part thereof in the vicinity of the passenger seat. In addition, in order to protect each passenger from a side face collision and subsequent rollover in the anteroposterior row, a curtain airbag which expands and deploys along the side window is provided in the vicinity of the ceiling of the wall part, while a side airbag which expands and deploys immediately beside the passenger is provided on the side part of a seat.

The inside of airbag cushions of various airbag apparatuses may be sectioned into multiple spaces in accordance with the object and installation environment. For example, in the passenger protection apparatus (front airbag) described in Patent Document 1, an airbag cushion is configured by a central gas bag 1 in the center along with an outer peripheral gas bag 3 disposed on the periphery thereof. The configuration of Patent Document 1 states that the restraining surface restraining a passenger is flatly expanded to give a wide area, thereby enabling the passenger to be assuredly caught.

RELATED ART DOCUMENTS

Patent Documents

[Patent Document 1] JP 1-132444 A

SUMMARY OF THE INVENTION

Current airbag apparatuses are also required to respond to irregular collisions or impacts such as so-called oblique collisions, for example, in which the impact is applied to a vehicle obliquely in the anteroposterior direction. During an oblique collision, a passenger enters an airbag cushion present in front of their seat at an irregular angle such as in the oblique direction. In this case, once the head of the passenger contacts the airbag cushion in front of the seat, rotation about the neck may occur when seen from above. Because such rotation of the head may induce an increase in the injury value of the passenger in terms of the structure of the human body, there has been a demand for the effective prevention thereof.

Problem to be Solved by the Invention

The present invention has been created in view of such a problem, and an object thereof is to provide an airbag apparatus in which the injury value of a passenger can be efficiently suppressed in an emergency.

Means for Solving the Problem

In order to solve the problem described above, a typical configuration of an airbag apparatus according to the present invention includes: an inflator which is installed in a vehicle so as to be capable of supplying gas; an inner bag which is expanded from in front of a seat utilizing the gas; and an outer bag to which the gas is supplied from the inflator or via the inner bag and expanded so as to surround the inner bag. Herein, the outer bag includes an opening which exposes the inner bag towards the seat, the inner bag has a more elongated shape in the anteroposterior direction of the vehicle than in the width direction of the vehicle, and the inner bag further includes a restraining part which is exposed on the recessed surface from the opening to the seat side.

The inner bag and the outer bag which are airbag cushions of this airbag apparatus are expanded by the pressure of the gas received from the same single inflator and therefore have equal internal pressure. However, when the base cloth of both the inner bag and the outer bag is viewed as a curved surface, because the outer shape of the inner bag is smaller than the outer shape of the outer bag, the curvature radius of the inner bag at any position of both regions is smaller than that of the outer bag. Further, the inner bag has an elongated shape in the anteroposterior direction of the vehicle, wherein the restraining part at the rear end on the seat side (that is, on the rear side of the vehicle) serves as the recessed surface. That is, the restraining part is a region having a particularly small curvature radius throughout the entire region of the inner bag. Consequently, the restraining part is a region having particularly low tension and low rigidity throughout the airbag cushion. This restraining part can more flexibly catch a passenger by, for example, absorbing the rotation of the head and better suppressing the injury value of the passenger.

The opening of the outer bag may be rimmed by a designated expansion part of this outer bag on the seat side of this outer bag, wherein the designated expansion part may include: an upper expansion part forming the upper edge of the opening; a lower expansion part forming the lower edge of the opening; a left expansion part forming the left edge of the opening; and a right expansion part forming the right edge of the opening. With a configuration of continuously surrounding the inner bag in which the expansion part of the outer bag is exposed, the expansion part of the outer bag, together with the inner bag, can restrain the passenger.

The upper expansion part can restrain the region from the forehead to the upper part of a passenger who is seated normally in the seat. This configuration allows the passenger to be suitably protected.

The lower expansion part can restrain the chest of a passenger who is seated normally in the seat. This configuration also allows the passenger to be suitably protected.

The left expansion part and the right expansion part can restrain the shoulders and temporal region of a passenger who is seated normally in the seat. This configuration also allows the passenger to be suitably protected.

The range from the outermost region of the left expansion part to the outermost region of the right expansion part in the width direction of the vehicle in the outer bag may be of a size which can restrain the upper body of the passenger, while the opening may be of a size in the width direction of the vehicle which can house the head in the upper body.

According to this configuration as well, the restraining part of the inner bag can flexibly restrain the head of the passenger with low rigidity, while the outer bag can sufficiently restrain, with high rigidity, the shoulders, chest, etc. which are solid and heavy in the body of the passenger.

The passenger may be an adult male or an adult female having an average physique or larger. These individuals having a certain degree of physique can be sufficiently restrained by the abovementioned inner bag and outer bag.

The base cloth configuring the restraining part of the inner bag may have a lower tension than the base cloth configuring the outer bag. This configuration allows the passenger to be more flexibly caught.

In the airbag apparatus, the size of the opening in the width direction of the vehicle may be wider than the width of the head of the passenger but narrower than the width of the shoulders of this passenger. According to this configuration as well, the restraining part can flexibly restrain the head of the passenger with low rigidity, while the outer bag can sufficiently restrain, with high rigidity, the shoulders, chest, etc. which are solid and heavy in the body of the passenger.

In the airbag apparatus, the size of the opening in the width direction of the vehicle may be smaller than the maximum size of the inner bag in the width direction of the vehicle. According to this configuration, the region of the inner bag having the maximum size in the width direction of the vehicle is surrounded by the outer bag, with only the restraining part serving as the rear end exposed from the opening. Consequently, even when a load is applied from the passenger to the restraining part, the inner bag can restrain the passenger without changing their posture.

The opening may be provided in the central region obtained by dividing the outer bag into three equal portions in the width direction of the vehicle. This configuration can also restrain the head of the passenger with the central restraining part, in addition to restraining the shoulders, chest, etc. of the passenger with the outer bag.

An edge of the opening on both sides in the width direction of the vehicle, as viewed from the rear of the vehicle, may draw a recessed curve towards the other edge. Because it is difficult to spread this opening in the width direction of the vehicle, the restraining part of the inner bag can be sufficiently surrounded and supported.

Effects of the Invention

The present invention allows an airbag apparatus to be provided in which the injury value of a passenger can be efficiently suppressed in an emergency.

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols in order to omit redundant descriptions along with the illustration of elements not directly related to the present invention.

Embodiment 1

Figure 1:
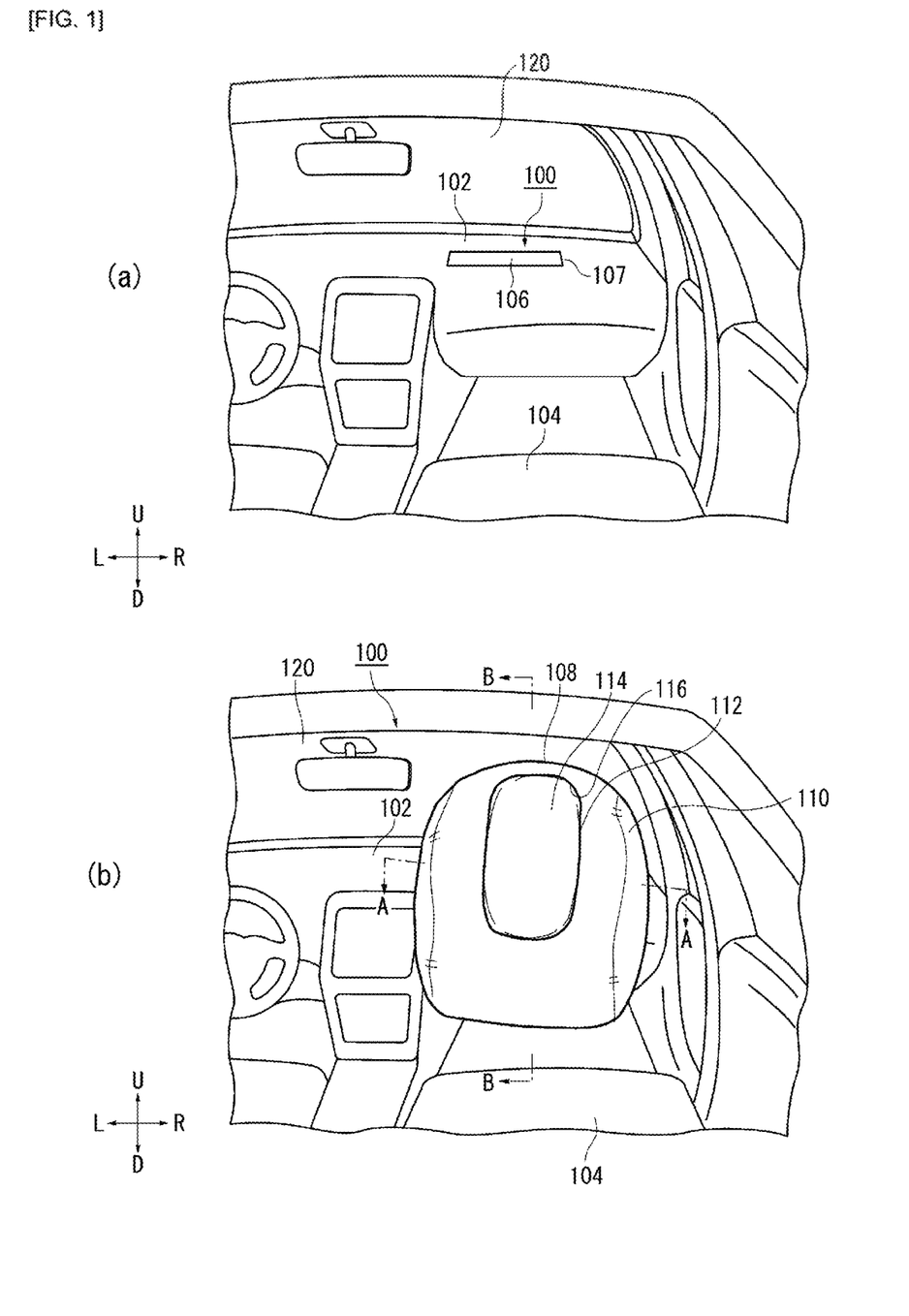
FIG. 1 is a view illustrating the outline of an airbag apparatus according to an embodiment of the present invention.

FIG. 1 is a view illustrating the outline of an airbag apparatus 100 according to an embodiment of the present invention. FIG. 1(a) is a view illustrating a vehicle prior to the operation of the airbag apparatus 100. In FIG. 1(a) and other drawings, the anteroposterior direction of the vehicle is indicated by arrows F (Forward) and B (Back), respectively, the left and right in the width direction of the vehicle are respectively indicated by arrows L (Left) and R (Right), and the vertical direction of the vehicle is indicated by arrows U (up) and D (down), respectively.

In the present embodiment, the airbag apparatus 100 is implemented as a passenger bag for a passenger seat (seat 104 on the right in the front row) in a vehicle with the steering wheel on the left side. Hereinafter, in order to provide descriptions assuming the seat 104 on the right in the front row, for example, the outside of the vehicle in the width direction of the vehicle means the right of the vehicle, while the inside of the vehicle in the width direction of the vehicle means the left of the vehicle.

An airbag cushion (hereinafter, a cushion 108 (see FIG. 1(b)) of the airbag apparatus 100 is housed in a housing part 106 provided in an instrument panel 102. The housing part 106 is installed in the vehicle in front of the seat 104, with, in addition to the cushion 108, an inflator 118 (see FIG. 2(a)) serving as a gas generator also housed in the housing part 106.

FIG. 1(b) is a view illustrating a vehicle after the operation of the airbag apparatus 100 in FIG. 1(a). The cushion 108 is bag shaped and formed by overlapping and sewing; alternatively, multiple base cloths (configuring the surface thereof) are adhered and overlapped or formed by spinning and weaving using an OPW (one-piece woven), etc.

The cushion 108 in the present embodiment has a so-called double structure including two regions consisting of an outer bag 110 (outside) and an inner bag 112 (inside) which are roughly divided. The inner bag 112 is configured so as to be expanded such that the periphery thereof is surrounded by the outer bag 110, with a restraining part 114 at the rear of the vehicle side exposed from an opening 116 of the outer bag 110.

Figure 2:
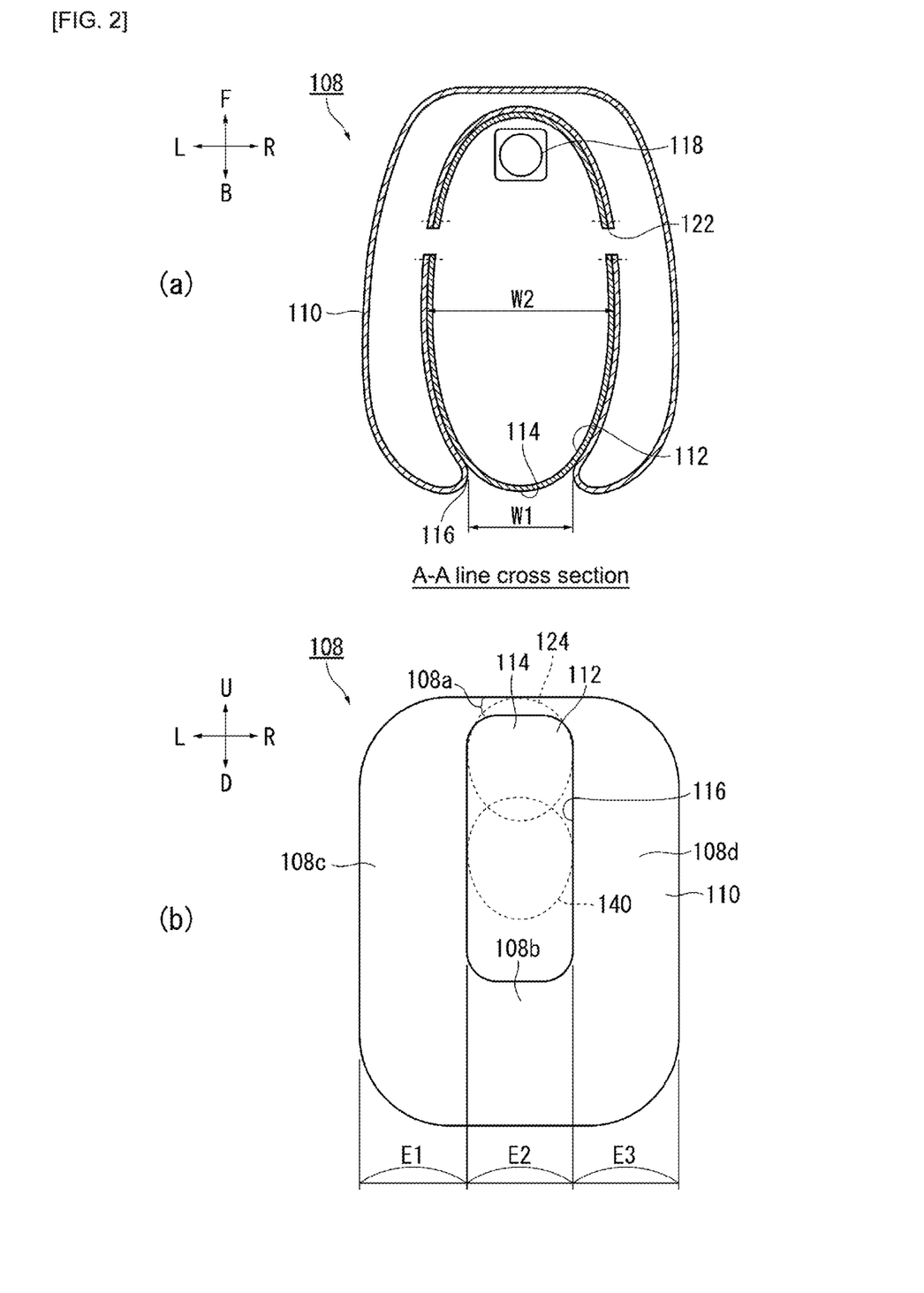
FIG. 2 is a view illustrating a cushion during expansion and deployment of FIG. 1(b) in each direction.

FIG. 2 is a view illustrating a cushion 108 during expansion and deployment of FIG. 1(b) in each direction. FIG. 2(a) is an A-A cross sectional view of the cushion 108 in FIG. 1(b). As illustrated in FIG. 2(a), the inner bag 112 is provided in a bag shape independent of the outer bag 110 and is expanded such that the periphery thereof is surrounded by the outer bag 110 from in front of the seat 104 (see FIG. 1(b)) of the vehicle.

A portion of the inflator 118 is inserted into the inner bag 112. The inflator 118 is operated upon receiving a detection signal of an impact sent from a sensor (not illustrated), so as to supply gas from the inner bag 108 first. The inner bag 112 and the outer bag 110 start to expand by the gas from the inflator 118, after which the expansion pressure thereof cleaves a cover 107 (see FIG. 1(a)), etc., and then expands and deploys towards the seat 104 so as to restrain the passenger from the front of the vehicle.

The inflator 118 is disc shaped, with a portion thereof inserted into the inner bag 112, and installed inside the housing part 106 (see FIG. 1(a)) of the vehicle. Exemplary currently prevailing inflators include: a type which is filled with a gas generating agent and burns the agent to generate gas; a type which is filled with compressed gas and supplies gas without generating heat; or a hybrid type which utilizes both combustion gas and compressed gas; etc. Any type can be used for the inflator 118.

An inner vent 122 serving as the gas passage is provided in the inner bag 112. The inner vent 122 discharges the gas from the inner bag 112, then supplies the gas to the outer bag 110. In this manner, the cushion 108 according to the present embodiment is configured such that the inner bag 112 is expanded prior to the outer bag 110.

The outer bag 110 is a region shaping the contour of the cushion 108 other than the central inner bag 112. The outer bag 110 is connected to the inner vent 122, the gas is supplied to the outer bag 110 via the inner bag 112, and the outer bag 110 is expanded so as to surround the inner bag 112. The opening 116 which exposes the inner bag 112 towards the seat 104 (see FIG. 1(b)) is provided in the outer bag 110. Note that the gas may be supplied directly from the inflator 118, not via the inner bag 112, such that the outer bag 110 may be expanded and deployed. For example, a configuration may be such that the outer bag 110 and the inner bag 112 are integrated in the vicinity of the inflator 118, while the gas from the inflator 118 is simultaneously supplied.

The restraining part 114 which restrains the head 126 of a passenger 124 (see FIG. 4(b), etc.) in the inner bag 112 is exposed from the opening 116. The cushion 108 restrains the head 126 of a passenger 124 mainly with the restraining part 114 of the inner bag 112, in addition to restraining the shoulders 128 and the chest 130 of the passenger 124 utilizing the surface on the seat side of the outer bag 110.

In the present embodiment, a structure in which the base cloth configuring the restraining part 114 has relatively lower tension than the base cloth configuring the outer bag 110 is achieved such that the injury value of the passenger 124 (see FIG. 4(b), etc.) can be efficiently suppressed in the event of an emergency. Hereinafter, this airbag apparatus 100 will be further described, focusing on the configuration of the restraining part 114.

The inner bag 112 and the outer bag 110 are expanded by the pressure of the gas received from the same single inflator 118 and therefore have equal internal pressure. However, when the base cloth of both the inner bag 112 and the outer bag 110 is viewed as a curved surface, because the outer shape of the inner bag 112 is smaller than the outer shape of the outer bag 110, the curvature radius of the inner bag 112 at any position of both regions is smaller than that of the outer bag 110. Consequently, when the inner bag 112 and the outer bag 110 are compared, the inner bag 112 has a base cloth with lower tension, leading to decreased rigidity.

The length of the inner bag 112 in the anteroposterior direction of the vehicle length is longer than the length thereof in the width direction of the vehicle. That is, the inner bag 112 has an elongated shape in the anteroposterior direction of the vehicle. The inner bag 112 in FIG. 2(a) is schematically illustrated and, as viewed from above the vehicle, has a shape close to an ellipse with the long axis in the anteroposterior direction of the vehicle. However, the inner bag 112 is not limited as long as it has a long shape in the anteroposterior direction of the vehicle. For example, various shapes such as a shape close to a rectangle and an irregular shape long in the anteroposterior direction of the vehicle can be appropriately employed.

The restraining part 114 serving as the rear end of the inner bag 112 is a surface which is recessed and curved on the seat side (lower side in FIG. 2(a)). Assuming that the inner bag 112 has a long shape in the anteroposterior direction of the vehicle, the restraining part 114 is the region having the smallest curvature radius in the inner bag 112. As a result, the restraining part 114 is a flexible region having particularly low tension and low rigidity throughout the entire cushion 108. Consequently, the restraining part 114 can more flexibly catch the passenger 124 (see FIG. 4(b), etc.)

In this airbag apparatus 100, the size W1 of the opening 116 in the width direction of the vehicle is smaller than the maximum size W2 of the inner bag 112 in the width direction of the vehicle. According to this configuration, the region of the inner bag 112 having the maximum size in the width direction of the vehicle is surrounded by the outer bag 110, with only the restraining part 114 serving as the rear end exposed from the opening 116. Consequently, even when a load is applied from the passenger 124 (see FIG. 4(b), etc.) to the restraining part 114, the inner bag 112 can restrain the passenger 124 without change of posture.

FIG. 2(b) is a view when the cushion 108 in FIG. 2(a) is viewed from the opposing rear side of the vehicle (lower side in FIG. 2(a)). As illustrated in FIG. 2(b), the opening 116 is provided in a slightly elongated shape in the vertical direction of the vehicle. While the opening 116 illustrated in FIG. 2(b) has a rectangular shape with round corners, the shape of the opening 116 is not limited, and for example, an opening having a shape close to a circle may be employed.

The opening 116 is provided in the central region E2 of three regions E1 to E3 obtained by dividing the outer bag 110 into three equal portions in the width direction of the vehicle. According to this configuration, the cushion 108 can restrain the head 126 of the passenger 124 (see FIG. 4(b), etc.) with the restraining part 114, in addition to restraining the shoulders 128, the chest 130, etc. of the passenger 124 with the outer bag 110.

On the seat 104 side of the outer bag 110, the opening 116 is rimmed by a designated expansion part of the outer bag 110. Specifically, the upper edge of the opening 116 is formed by an upper expansion part 108a, while the lower edge of the opening 116 is formed by a lower expansion part 108b. Moreover, the left edge of the opening 116 is formed by a left expansion part 108c, while the right edge of the opening 116 is formed by a right expansion part 108d. As described above, the outer bag 110 is configured such that each expansion part continuously surrounds the up, down, right, and left parts of the exposed inner bag 114, on the seat 104 side of the cushion 108, that is, within the range in which the passenger 124 (in the figure) seated in the seat 104 can contact the cushion 108.

Here, the image of a figure assumed to be the passenger 124 (see FIG. 3) with the head 126 illustrated in FIG. 2(b) will be described. The passenger 124 is illustrated so as to include any of an AM50 dummy or an AM95 dummy of HybridIII or a Thor dummy, which are human body dummies for testing front face collisions of an automobile. The AM50 dummy is a human body dummy imitating a person having a body height of 175 cm, a seating height of 88 cm, and a body weight of appropriately 78 kg as an American adult male model having an average physique. The AM95 dummy is a human body dummy imitating a person having a body height of 183 cm, a seating height of 94 cm, and a body weight of appropriately 101 kg as an American adult male model having a large physique. The Thor dummy is a human body dummy which has been developed as the successor to the HybridIII dummy, with only males having an average physique as models. These human body dummies are created based on the standards of NHTSA (National Highway Traffic Safety Administration).

The expansion part of the outer bag 110 according to the present embodiment (see FIG. 2(b)) can restrain the passenger 124 (see FIG. 3, etc.) together with the inner bag 114. For example, the upper expansion part 108a can restrain the region from the forehead to the upper part in the head 126 of the passenger 124 who is seated normally in the seat 104. Moreover, the lower expansion part 108b can restrain the chest 130 of the passenger 124 who is seated normally in the seat 104. The left expansion part 108c and the right expansion part 108d can restrain the shoulders 128 and the temporal region of the passenger 124 who is seated normally in the seat 104. These configurations allow the passenger 124 to be suitably protected.

The outer bag 110 in FIG. 2(b) can sufficiently restrain each region of an adult female having an average physique or larger, in addition to an adult male having an average physique and an adult male having a large physique which are assumed to be the passenger 124. However, in the case of a small female passenger, the head 140 may be only restrained with the inner bag 114, and may not reach the upper expansion part 108a. Note that one example of a small female is AF05 in the abovementioned HybridIII dummy. AF05 is a human body dummy imitating a person having a body height of 145 cm, a seating height of 79 cm, and a body weight of appropriately 45 kg as a female model having a small physique.

Figure 3:
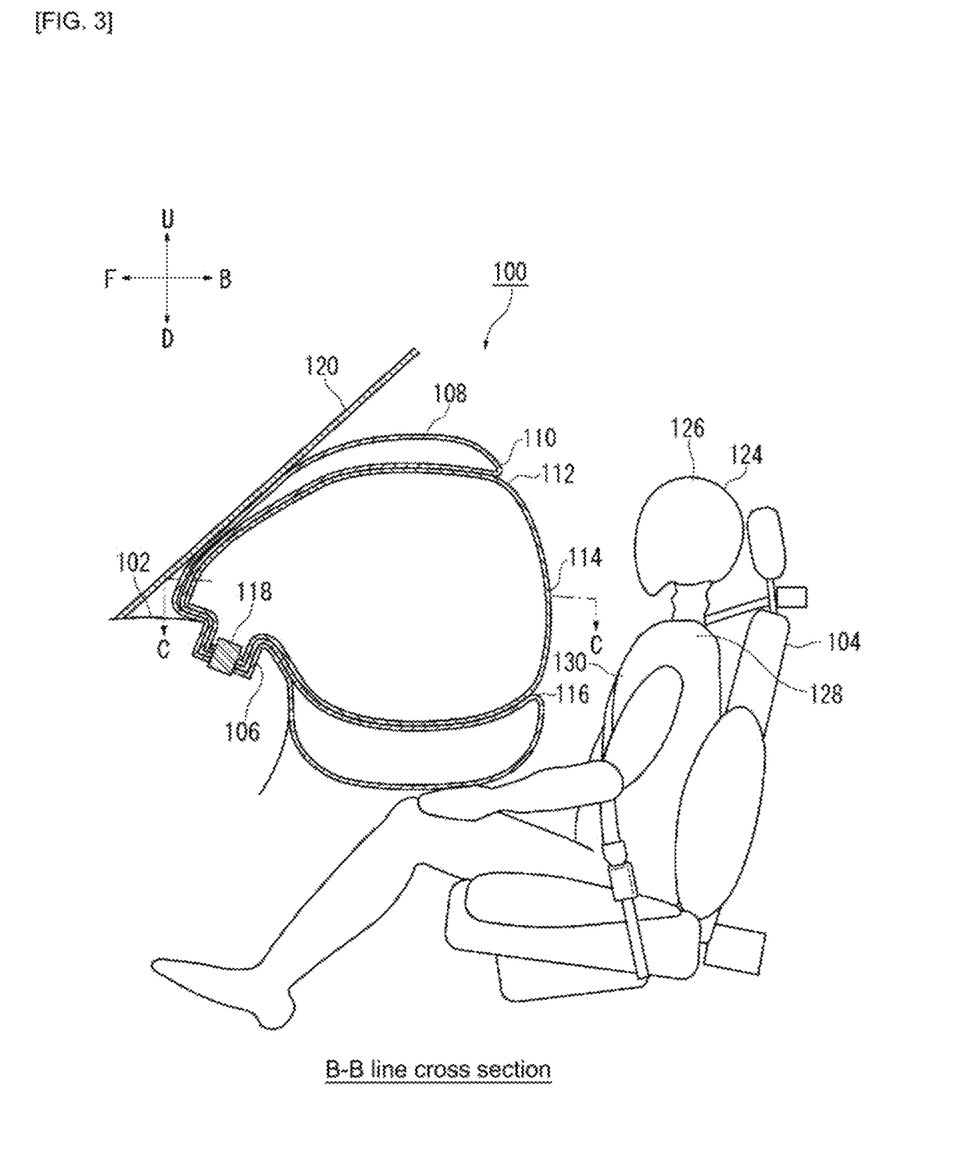
FIG. 3 is a B-B cross sectional view of the cushion in FIG. 1(b).

FIG. 3 is a B-B cross sectional view of the cushion 108 in FIG. 1(b). FIG. 3 also schematically illustrates the cushion 108, etc., but does not limit the size relationship and positional relationship of the cushion 108 and the passenger 124.

As mentioned above, the inner bag 112 has a long shape in the anteroposterior direction of the vehicle. As viewed from the width direction of the vehicle, regarding the shape of the inner bag 112, the size in the vertical direction of the vehicle gradually increases from the instrument panel 102 towards the seat 104 at the rear of the vehicle. However, regarding the inner bag 112, the size in the anteroposterior direction of the vehicle is set to be roughly larger than the size in the vertical direction of the vehicle.

The cushion 108 is expanded and deployed so as to fill the space between the passenger 124 of the seat 104 and the instrument panel 102 and windshield 120. This prevents the passenger 124 from colliding with the instrument panel 102, etc. Moreover, a collision of the passenger on the windshield 120 is prevented, while the passenger 124 is prevented from being thrown outside the vehicle.

Here, in FIG. 3, exemplary passengers 124 include a dummy doll. If the size of this airbag apparatus 100 is defined based on the body of the passenger 124, for example, it can be determined based on AM95 of the dummy doll (corresponding to large American adult males (American males 95%, 95% of smaller males)).

Figure 4:
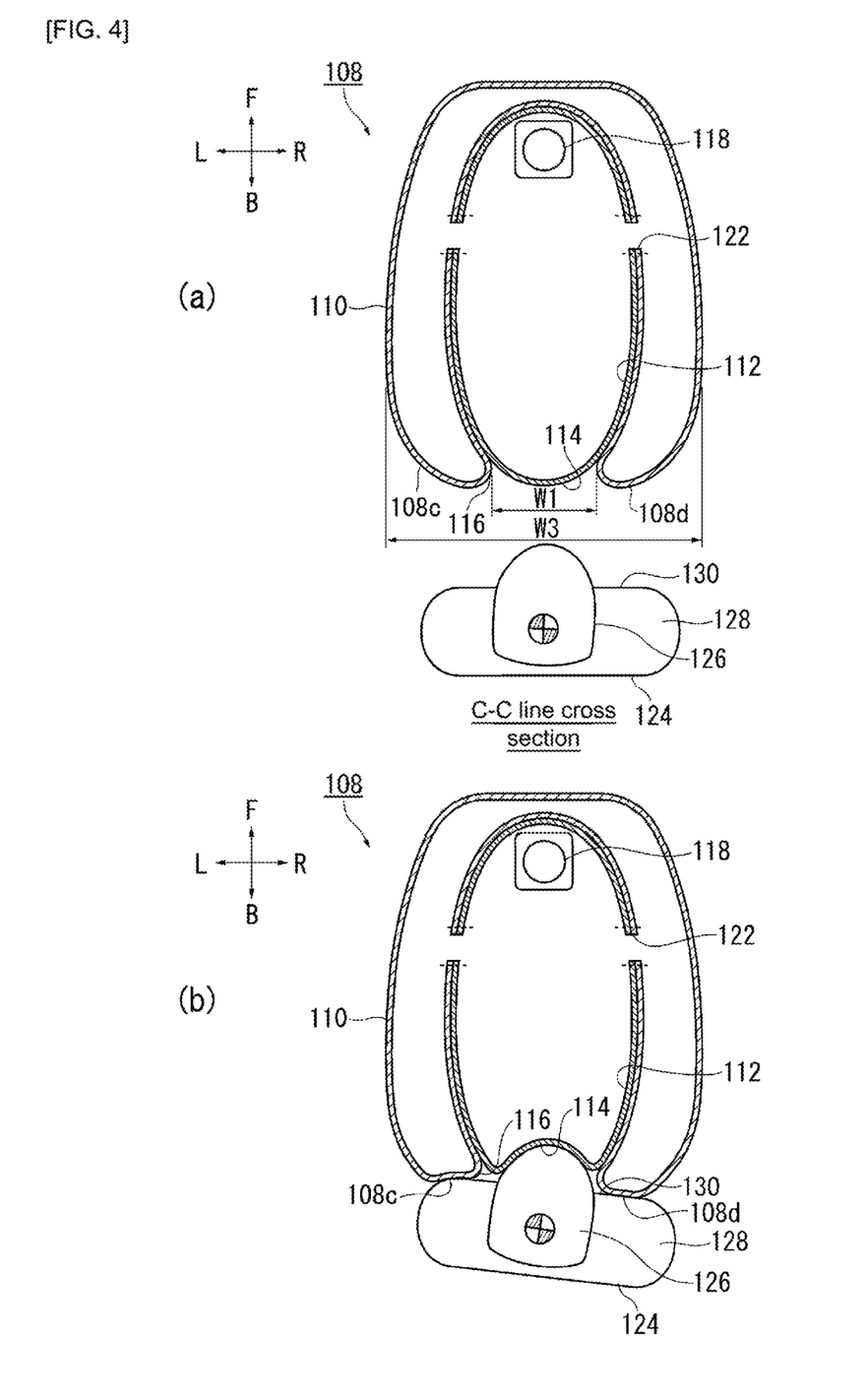
FIG. 4 is a view illustrating the cushion of FIG. 3 in a different direction.

FIG. 4 is a view illustrating the cushion 108 of FIG. 3 in a different direction. FIG. 4(a) is a view corresponding to a C-C cross section of the cushion 108 in FIG. 3.

In the present embodiment, the range from the outermost region of the left expansion part 108c to the outermost region of the right expansion part 108d in the width direction of the vehicle in the outer bag 110 is set to be of a size W3 in the width direction of the vehicle which can restrain the upper body of the passenger 124. In addition, the size W1 of the opening 116 in the width direction of the vehicle can house the head 126 in the upper body. In other words, the size W1 of the opening 116 in the width direction of the vehicle is wider than the width of the head 126 of the passenger 124 but narrower than the width of the shoulders 128 of the passenger 124. According to these configurations, in the cushion 108, the restraining part 114 of the inner bag 112 can flexibly restrain the head 126 of the passenger 124 with low rigidity, while the outer bag 110 can sufficiently restrain, with high rigidity, the shoulders 128, the chest 130, etc. which are solid and heavy in the body of the passenger 124.

FIG. 4(b) is a view illustrating a state in which the cushion 108 in FIG. 4(a) restrains a passenger 124. Here, a phenomenon presumed to be during an oblique collision is illustrated. The passenger 124 slightly obliquely enters the cushion 108 upon an oblique collision.

As mentioned above, the restraining part 114 of the inner bag 112 can more flexibly catch the head 126 because the tension of the base cloth is set to be lower than that of the base cloth of the outer bag 110. In addition, the outer bag 110 widely restrains portions including the shoulders 128 and the chest 130 of the passenger 124, etc., in addition to the head 126 of the passenger.

The inner bag 112 and the outer bag 110 are connected via the inner vent 122. Therefore, upon restraining the head 126 with the inner bag 112, gas can be discharged from the inner bag 112 so as to more flexibly receive the head 126, with the gas being supplied to the outer bag 110 so as to more sufficiently catch the shoulders 128, etc.

Here, if only a single set cushion is present in front of the passenger 124, when the head 126 of the obliquely moving passenger 124 contacts the cushion, the friction between the head 126 and the cushion may generate a difference between the motion of the head 126 and that of the shoulders 128, in addition to generating a clockwise rotation force (rotation force of turning around to the left and right with the cervical spine serving as the axis) in the head 126 with the neck serving as the axis as seen from above the vehicle with respect to the shoulders 128, etc. When such a rotation is generated in the head 126, the injury value of the passenger 124 tends to be high.

With that, in the present embodiment, the head 126 of the passenger 124 is configured to contact the restraining part 114 of the inner bag 112 having low rigidity so as to be flexibly restrained. In addition, the shoulders 128, the chest 130, etc. which are solid and heavy in the body are sufficiently restrained utilizing the restraining part 114 as well as the outer bag 110 having high rigidity. These minimize the rotation of the head 126 to the shoulders 128 of the passenger 124, in addition to aligning and restraining the motion of the head 126 with the motion of the shoulders 128. In this manner, in the present embodiment, the rotation of the head 126 of the passenger 124 can be significantly decreased or negated, while the angle speed of the head 126 can be decreased so as to suppress the injury value of the passenger 124 caused by the rotation of the head 126.

According to the configuration of the present embodiment, not only upon an oblique collision, but also upon a normal collision in the anteroposterior direction of the vehicle, a high passenger restraint performance can be restrained so as to suppress the injury value and movement of the passenger 124.

Note that in the foregoing, with reference to FIG. 4(*b*), exemplary rotations generated in the head 126 include clockwise rotations. However, depending on the circumstances in the event of an emergency, for example, the passenger 124 may move obliquely forward on the vehicle interior side, with a counterclockwise rotation potentially generated in the head 126 with the neck serving as the center as viewed from above. This counterclockwise rotation can be decreased or negated by the cushion 108 of the present embodiment, while the angle speed of the head 126 can be reduced. That is, the airbag apparatus 100 according to the present embodiment can obtain the same effects in a passenger 124 who moves in any width direction of the vehicle.

Modified Example 1

Figure 5:
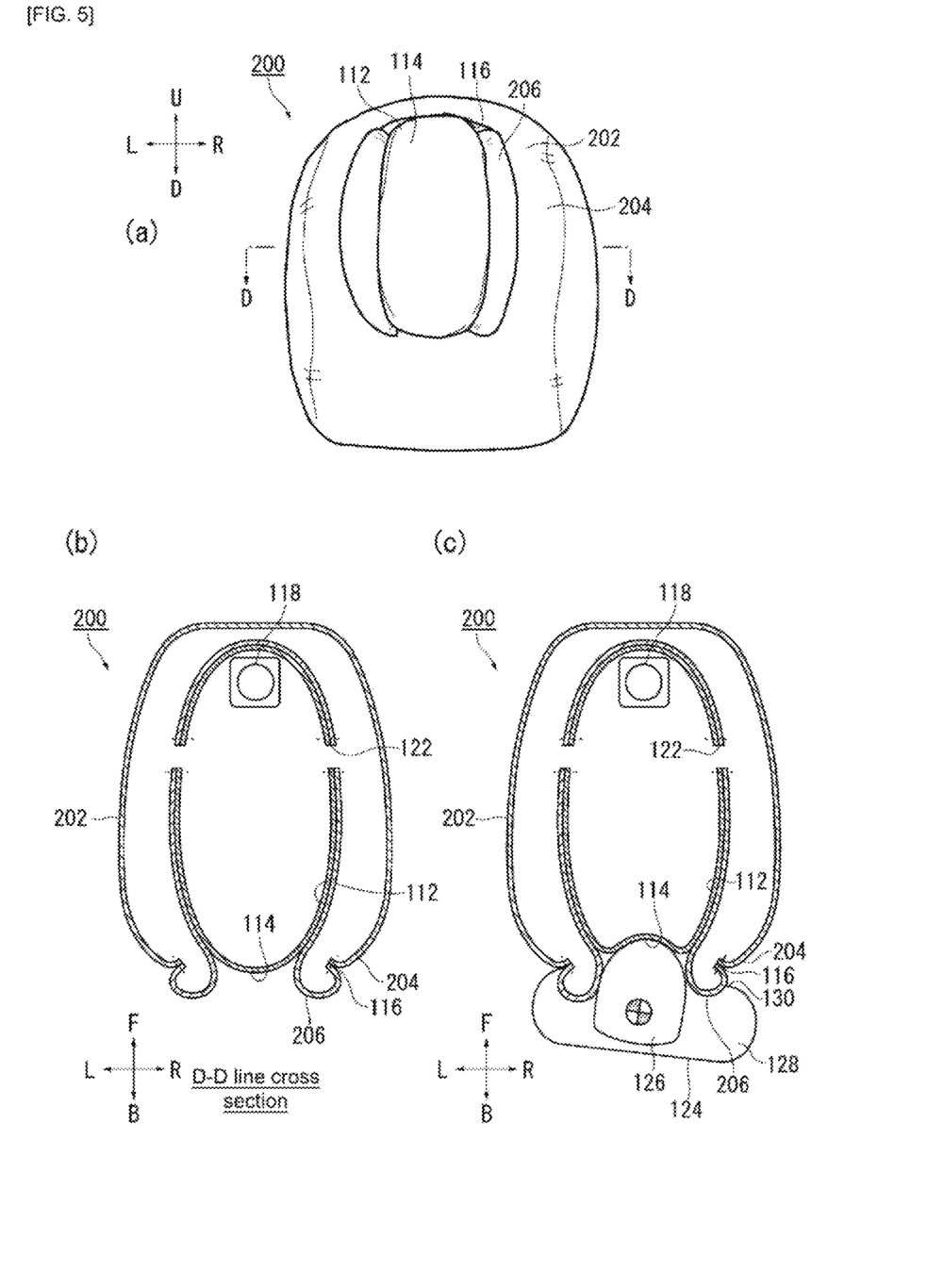
FIG. 5 is a view illustrating Modified Example 1 of the cushion illustrated in FIG. 1(b), etc.

FIG. 5 is a view illustrating Modified Example 1 of the cushion 108 illustrated in FIG. 1(*b*), etc. Hereinafter, the same components as described above are labeled with the same symbols, with the descriptions thereof omitted. Moreover, the same names as the components described above shall have the same functions unless otherwise indicated even when labeled with different symbols.

In a cushion 200 illustrated in FIG. 5(*a*), the portion (inner base cloth 206) configuring the inside of the opening 116 in the base cloth configuring an outer bag 202 is expanded so as to protrude towards the seat 104 (see FIG. 1(*b*)). In particular, the inner base cloth 206 is linearly expanded along the vertical direction of the vehicle on left and right sides of the opening 116 in the width direction of the vehicle.

FIG. 5(*b*) is a D-D cross sectional view in FIG. 5(*a*). With the inner bag 112, etc. regarded as the center, the outer bag 202 is roughly divided and configured to include: an outer base cloth 204 forming the outer surface (outside); and the inner base cloth 206 contacting the inner bag 112 inside the opening 116. The outer base cloth 204 is expanded as a curved surface, with the opening 116 provided within a designated range on the seat side. This opening 116 serves as the boundary between the outer base cloth 204 and the inner base cloth 206, with the inner base cloth 206 expanded such that a portion thereof protrudes from the opening 116 to the seat side. The portion protruding from the opening 116 of the inner base cloth 206 has a base cloth with low tension and is therefore effective in flexibly catching the passenger 124 (see FIG. 5(*c*)) and suppressing the injury value.

In the outer base cloth 204 and the inner base cloth 206 of the outer bag 202, when both base cloths upon expansion are viewed as a curved surface, the inner base cloth 206 present inside has a roughly smaller curvature radius than the outer base cloth 204 present outside. Generally, the pressure and curvature radius affect the tension of the base cloth. Because the outer bag 202 is expanded by the pressure of gas received from one inflator 118, the inner base cloth 206 has a base cloth with lower tension than the outer base cloth 204 in accordance with the size relationship of the curvature radius. As a result, the outer bag 202 according to the present embodiment is configured such that the inner base cloth 206 having low tension protrudes.

FIG. 5(*c*) is a view illustrating a state in which the cushion 200 in FIG. 5(*b*) restrains the passenger 124. The passenger 124 slightly obliquely enters the cushion 200 upon an oblique collision. The inner base cloth 206 which is expanded along the edge of the opening 116 is present at a position slightly biased to the left and right in the width direction of the vehicle with respect to the front of the seat 104. Consequently, when the passenger 124 moves from the seat 104 in the oblique direction, the passenger 124 also contacts the inner base cloth 206. At this time, because the inner base cloth 206 protrudes to the seat side (lower side in FIG. 5(*c*)) and the tension thereof is set to be lower than that of the outer base cloth 204, the head 126 (including the vicinity of the temporal region) can be more flexibly caught.

In this cushion 200, the inner bag 112 and the inner base cloth 206 restrain the head 126 of the passenger 124, while the outer base cloth 204 restrains the shoulders 128, the chest 130, etc. of the passenger 124. These actions allow the cushion 200 to better align the motion of the head 126 of the passenger 124 with the motion of the shoulders 128, etc. thereof, in addition to enabling any rotation (including the rotation of turning around the head 126 to the left and right with respect to the shoulders 128 and the rotation involving tilting the head 126 vertically and horizontally) to be minimized for restraint. In this manner, the cushion 200 can significantly suppress the injury value of the passenger 124.

Modified Example 2

Figure 6:
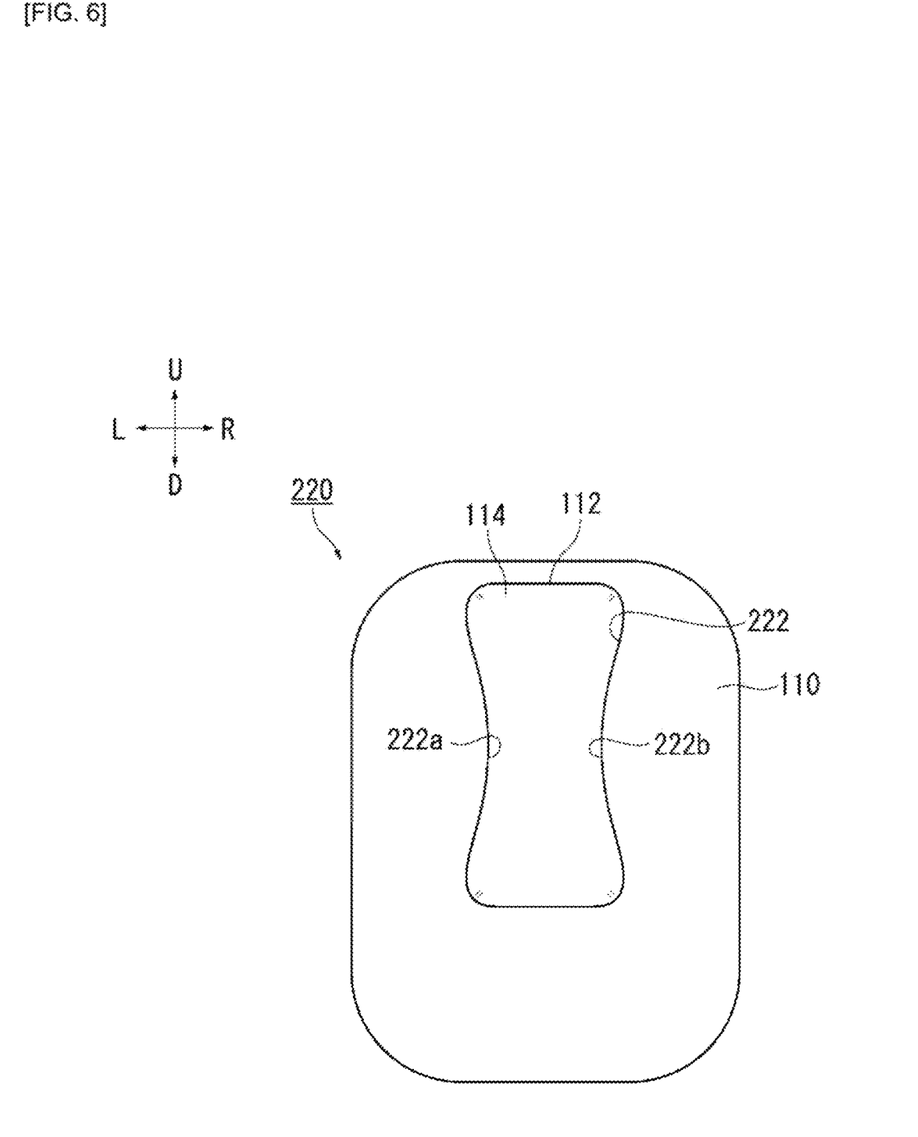
FIG. 6 is a view illustrating Modified Example 2 of the cushion illustrated in FIG. 1(b), etc.

FIG. 6 is a view illustrating Modified Example 2 of the cushion 108 illustrated in FIG. 1(*b*), etc. In this cushion 220, as viewed from the rear of the vehicle, each of the edges 222*a*, 222*b* on both sides of an opening 222 in the width direction of the vehicle is shaped to draw a recessed curve towards the other edge. It is difficult to spread the opening 222 having the edges 222*a*, 222*b* of this shape in the width direction of the vehicle. Consequently, the opening 222 can sufficiently surround and support the restraining part of the inner bag 112.

Preferred examples of the present invention were described above while referring to the accompanying drawings. However, the embodiments described above are preferred examples of the present invention, and other embodiments can be implemented or performed by various methods. In particular, unless described otherwise in the specification of the present application, the invention is not restricted to the shape, size, configurational disposition, and the like of parts illustrated in detail in the accompanying drawings. Furthermore, expressions and terms used in the specification of the present application are used for providing a description, and the invention is not limited thereto, unless specifically described otherwise.

Therefore, it is obvious that a person with ordinary skill in the art can conceive of various changed examples or modified examples within the scope described in the scope of the claims, which is understood to naturally belong to the technical scope of the present invention.

INDUSTRIAL APPLICABILITY

The present invention can be used in an airbag apparatus which restrains passengers in the event of an emergency.

REFERENCE NUMERALS

E1 to E3 . . . region in which the cushion is divided into three equal portions in the width direction of the vehicle, W1 . . . size of the opening in the width direction of the vehicle, W2 . . . maximum size of the inner bag in the width direction of the vehicle, W3 . . . size of the outer bag in the width direction of the vehicle, 100 . . . airbag apparatus, 102 . . . instrument panel, 104 . . . seat, 106 . . . housing part, 107 . . . cover, 108 . . . cushion, 108*a* . . . upper expansion part, 108*b* . . . lower expansion part, 108*c* . . . left expansion part, 108*d* . . . right expansion part, 110 . . . outer bag, 112 . . . inner bag, 114 . . . restraining part, 116 . . . opening, 118 . . . inflator, 120 . . . windshield, 122 . . . inner vent, 124 . . . passenger, 126 . . . head, 128 . . . shoulders, 130 . . . chest, 140 . . . head of a small female, 200 . . . cushion of Modified Example 1, 202 . . . outer bag, 204 . . . outer base cloth, 206 . . . inner base cloth, 220 . . . cushion of Modified Example 2, 222 . . . opening, 222*a* . . . left edge of the opening, 222*b* . . . right edge of the opening

The invention claimed is:

1. An airbag apparatus, comprising:
  an inflator which is installed in a vehicle so as to be capable of supplying gas;
  an inner bag which is expanded from in front of a seat utilizing the gas; and
  an outer bag to which the gas is supplied from the inflator or via the inner bag and expanded so as to surround the inner bag;
  wherein:
  the outer bag includes an opening which exposes the inner bag towards the seat,
  the inner bag has a more elongated shape in the antero-posterior direction of the vehicle than in the width direction of the vehicle,
  the inner bag further includes a restraining part which is exposed on a recessed surface of the opening to the seat side, and
  a base cloth configuring the restraining part of the inner bag has lower tension than a base cloth configuring the outer bag when the inner bag and the outer bag are equally pressurized.

2. The airbag apparatus according to claim 1, wherein:
  the opening of the outer bag is rimmed by a designated expansion part of this outer bag on the seat side of this outer bag; and
  the designated expansion part includes:
  an upper expansion part forming an upper edge of the opening;
  a lower expansion part forming a lower edge of the opening;
  a left expansion part forming a left edge of the opening; and
  a right expansion part forming a right edge of the opening.

3. The airbag apparatus according to claim 2, wherein the upper expansion part can restrain the region from the forehead to an upper part of a passenger who is seated normally in the seat.

4. The airbag apparatus according to claim 3, wherein the lower expansion part can restrain the chest of the passenger who is seated normally in the seat.

5. The airbag apparatus according to claim 3, wherein the left expansion part and the right expansion part can restrain the shoulders and temporal region of the passenger who is seated normally in the seat.

6. The airbag apparatus according to claim 3, wherein:
  the range from the outermost region of the left expansion part to the outermost region of the right expansion part in the width direction of the vehicle in the outer bag is of a size which can restrain the upper body of the passenger, and
  the opening is of a size in the width direction of the vehicle which can house the head in the upper body.

7. The airbag apparatus according to claim 2, wherein the lower expansion part can restrain the chest of a passenger who is seated normally in the seat.

8. The airbag apparatus according to claim 7, wherein the left expansion part and the right expansion part can restrain the shoulders and temporal region of the passenger who is seated normally in the seat.

9. The airbag apparatus according to claim 7, wherein:
  the range from the outermost region of the left expansion part to the outermost region of the right expansion part in the width direction of the vehicle in the outer bag is of a size which can restrain the upper body of the passenger, and
  the opening is of a size in the width direction of the vehicle which can house the head in the upper body.

10. The airbag apparatus according to claim 2, wherein the left expansion part and the right expansion part can restrain the shoulders and temporal region of a passenger who is seated normally in the seat.

11. The airbag apparatus according to claim 10, wherein:
  the range from the outermost region of the left expansion part to the outermost region of the right expansion part in the width direction of the vehicle in the outer bag is of a size which can restrain the upper body of the passenger, and
  the opening is of a size in the width direction of the vehicle which can house the head in the upper body.

12. The airbag apparatus according to claim 2, wherein:
  the range from the outermost region of the left expansion part to the outermost region of the right expansion part in the width direction of the vehicle in the outer bag is of a size which can restrain the upper body of a passenger, and
  the opening is of a size in the width direction of the vehicle which can house the head in the upper body.

13. The airbag apparatus according to claim 1, wherein the size of the opening in the width direction of the vehicle is smaller than the maximum size of the inner bag in the width direction of the vehicle.

14. The airbag apparatus according to claim 1, wherein the opening is provided in the central region obtained by dividing the outer bag into three equal portions in the width direction of the vehicle.

15. The airbag apparatus according to claim 1, wherein an edge of the opening on both sides in the width direction of the vehicle, as viewed from the rear of the vehicle, draws a recessed curve towards the other edge.

* * * * *